United States Patent
Park et al.

(10) Patent No.: US 8,380,216 B2
(45) Date of Patent: *Feb. 19, 2013

(54) ALLOCATING RADIO RESOURCES IN MOBILE COMMUNICATIONS SYSTEM

(75) Inventors: Sung-Jun Park, Gyeonggi-Do (KR);
Young-Dae Lee, Gyeonggi-Do (KR);
Sung-Duck Chun, Gyeonggi-Do (KR);
Myung-Cheul Jung, Seoul (KR);
Patrick Fischer, Bourg la Reine (FR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/485,817

(22) Filed: May 31, 2012

(65) Prior Publication Data

US 2012/0236810 A1    Sep. 20, 2012

Related U.S. Application Data

(63) Continuation of application No. 13/309,489, filed on Dec. 1, 2011, now Pat. No. 8,244,269, which is a continuation of application No. 12/912,703, filed on Oct. 26, 2010, now Pat. No. 8,090,382, which is a continuation of application No. 12/160,100, filed as application No. PCT/KR2007/000067 on Jan. 4, 2007, now Pat. No. 7,881,724.

(60) Provisional application No. 60/771,791, filed on Feb. 8, 2006, provisional application No. 60/771,305, filed on Feb. 7, 2006, provisional application No. 60/757,063, filed on Jan. 5, 2006.

(30) Foreign Application Priority Data

Aug. 3, 2006 (KR) .................. 10-2006-0073210

(51) Int. Cl.
*H04W 72/00* (2009.01)
*H04W 4/00* (2009.01)
*H04B 7/212* (2006.01)

(52) U.S. Cl. ............ 455/452.2; 370/329; 370/348

(58) Field of Classification Search .......... 455/450, 455/452.2, 515, 436, 451, 452.1, 453; 370/328, 370/329, 336, 338, 345, 346, 347, 348
See application file for complete search history.

(56) References Cited

U.S. PATENT DOCUMENTS

| 2004/0014452 A1* | 1/2004 | Lim et al. ............. 455/403 |
| 2004/0264550 A1* | 12/2004 | Dabak ................. 375/142 |
| 2006/0018289 A1* | 1/2006 | Schulist et al. ........ 370/335 |
| 2006/0062196 A1* | 3/2006 | Cai et al. ............. 370/345 |

FOREIGN PATENT DOCUMENTS

| JP | 2000-175271 | 6/2000 |
| JP | 2001-522557 | 11/2001 |
| JP | 2003-504942 | 2/2003 |
| JP | 2004-312771 | 11/2004 |
| JP | 2005-217743 | 8/2005 |

(Continued)

*Primary Examiner* — Christopher M Brandt
(74) *Attorney, Agent, or Firm* — Lee, Hong, Degerman, Kang & Waimey

(57) ABSTRACT

Transmitting information using a preamble of a Random Access Channel (RACH) in an Evolved Universal mobile Telecommunications System (E-UMTS) is provided. A preamble transmission is used to inform a base station of specific information when a terminal uses a RACH and the base station efficiently allocates radio resources for data transmission to the terminal according to the specific information. Delay time before the terminal transmits data is reduced and unnecessary consumption of radio resources is minimized.

12 Claims, 3 Drawing Sheets

FOREIGN PATENT DOCUMENTS

| | | |
|---|---|---|
| JP | 2005-525066 | 8/2005 |
| JP | 2005-525720 | 8/2005 |
| JP | 2007-503155 | 2/2007 |
| JP | 2007-508749 | 4/2007 |
| JP | 2008-509582 | 3/2008 |
| JP | 2008-510424 | 4/2008 |
| WO | 2005/018269 | 2/2005 |
| WO | 2005/036917 | 4/2005 |
| WO | 2006/012946 | 2/2006 |
| WO | 2006/033552 | 3/2006 |

* cited by examiner

[Fig. 1]
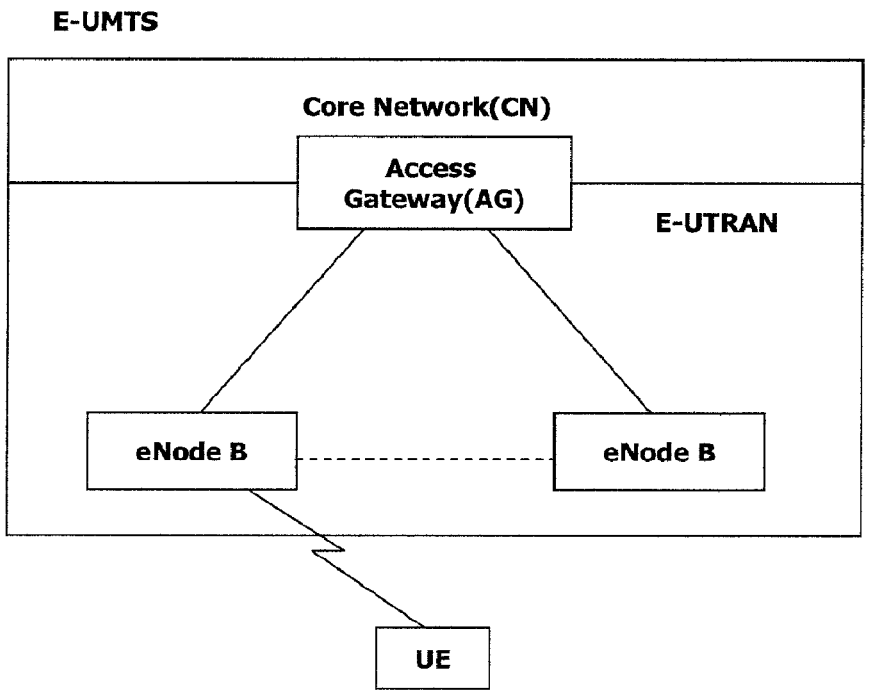
[Fig. 2]
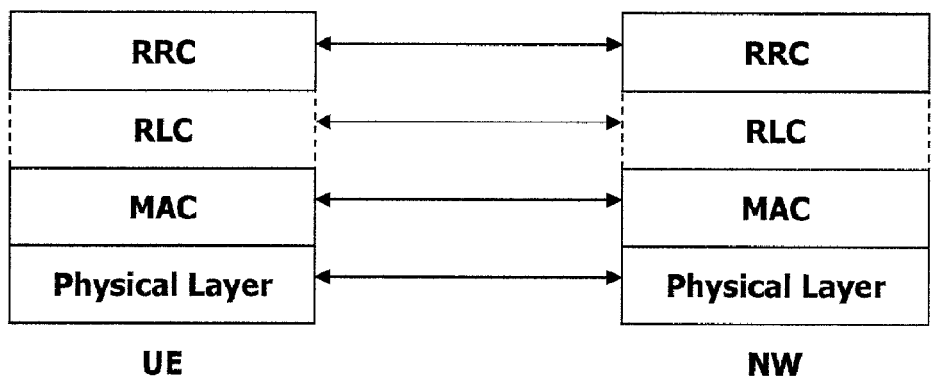
[Fig. 3]
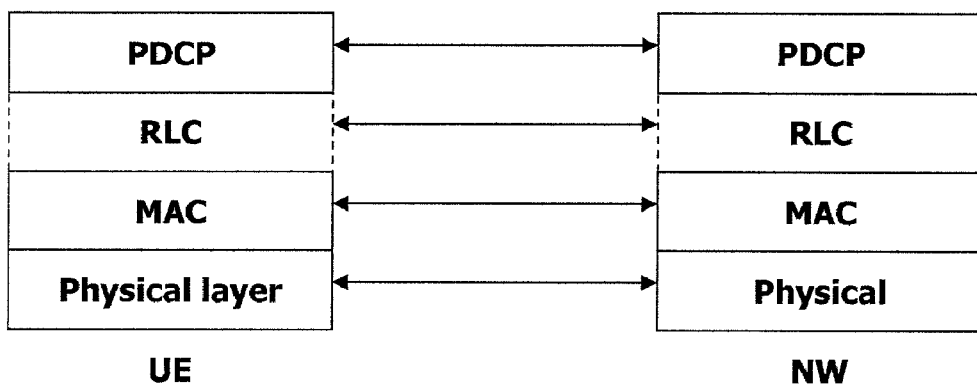

[Fig. 4]
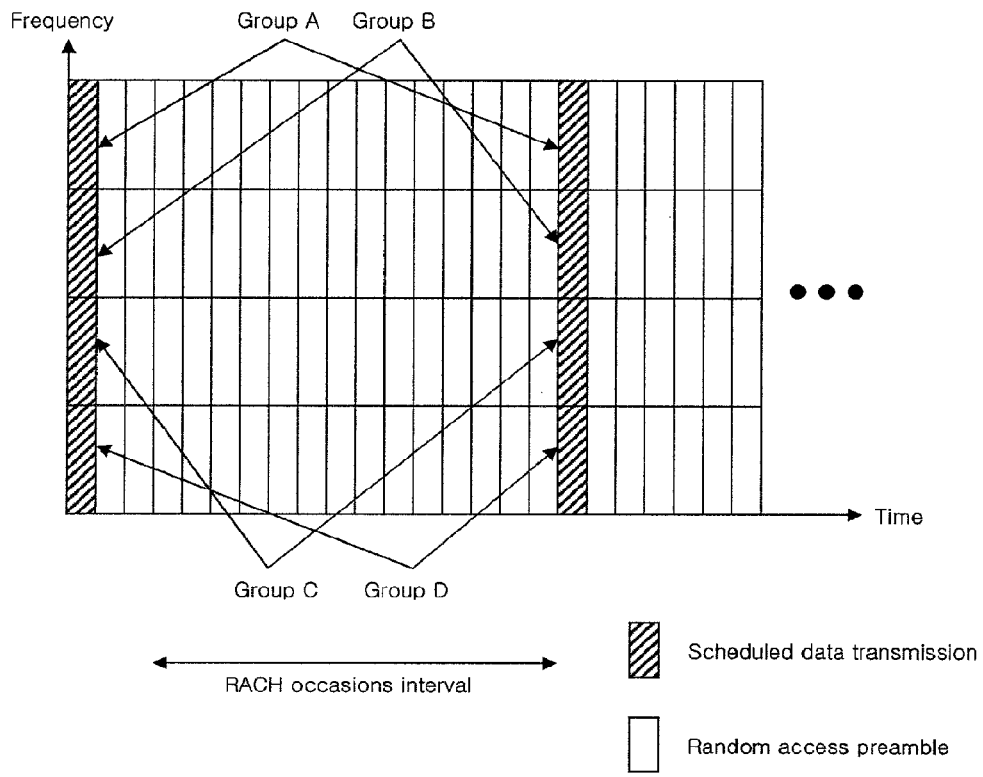
[Fig. 5]
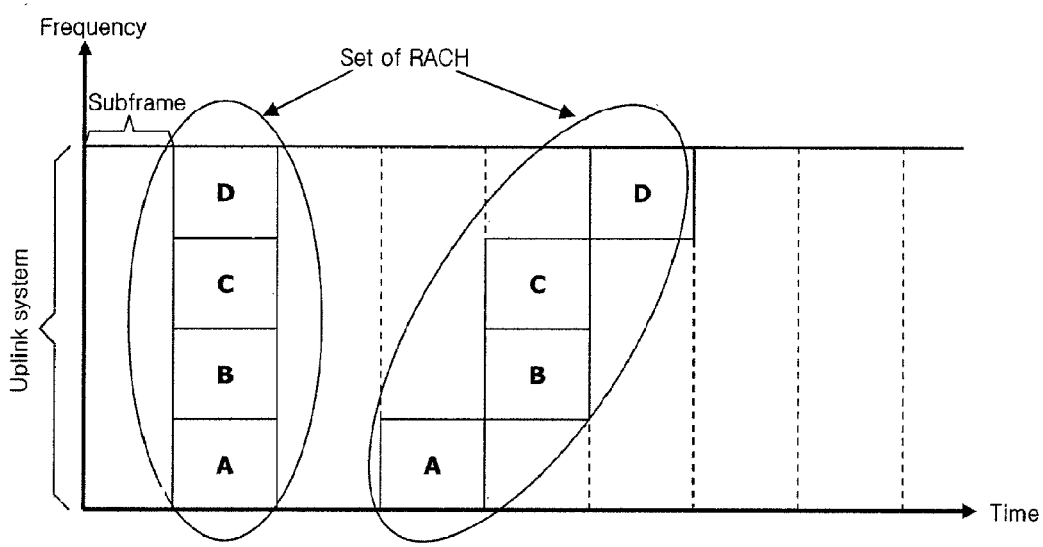

[Fig. 6]
| Establishment Cause(A,B) | CQI (0,1) | Available resources(A~G) and signatures(0~15) | Number of random ids/ signatures |
|---|---|---|---|
| A | 0 | A0,..., A10, B0,..., B7, C0,...,C1 | 21 |
| B | 0 | B8,...,B15, C2,...,C4 | 11 |
| A | 1 | C5,...,C9, D0,...,D8 | 14 |
| B | 1 | A11,...,A15, C10,...,C15, D9,...,D15 | 18 |
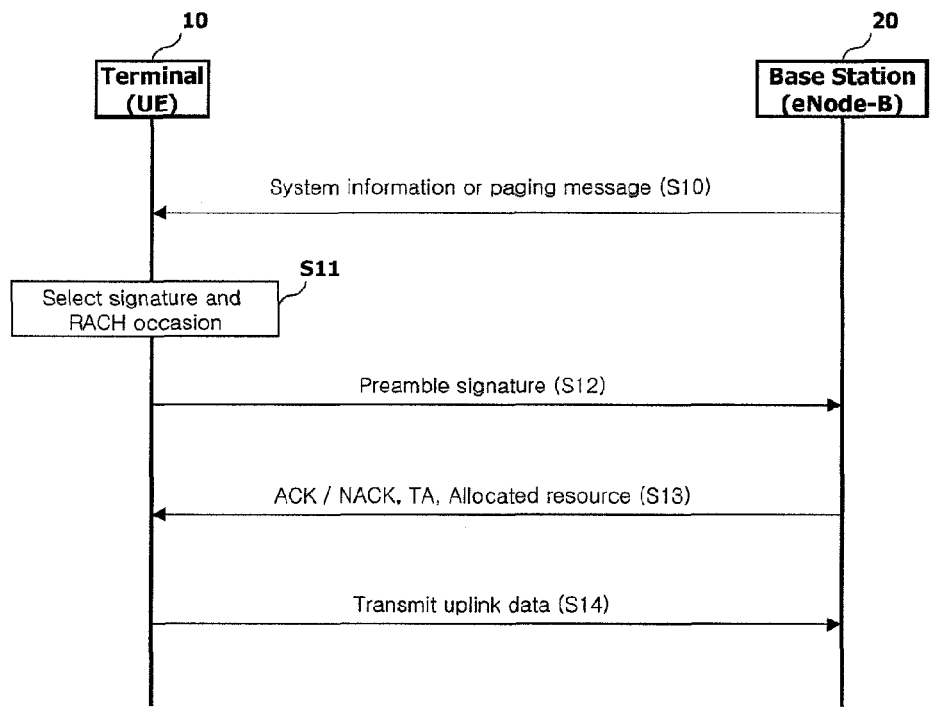
[Fig. 7]

ALLOCATING RADIO RESOURCES IN MOBILE COMMUNICATIONS SYSTEM

CROSS-REFERENCE TO RELATED APPLICATIONS

This application is a continuation of U.S. application Ser. No. 13/309,489, filed Dec. 1, 2011, now U.S. Pat. No. 8,244,269, which is a continuation of U.S. application Ser. No. 12/912,703, filed Oct. 26, 2010, now U.S. Pat. No. 8,090,382, which is a continuation of U.S. application Ser. No. 12/160,100, filed Jul. 3, 2008, now U.S. Patent No. 7,881,724, which is the National Stage filing under 35 U.S.C. 371 of International Application No. PCT/KR2007/000067, filed on Jan. 4, 2007, which claims the benefit of earlier filing date and right of priority to Korean Application No. 10-2006-0073210, filed on Aug. 3, 2006, and also claims the benefit of U.S. Provisional Application Ser. Nos. 60/771,791, filed on Feb. 8, 2006, 60/771,305, filed on Feb. 7, 2006, and 60/757,063, filed on Jan. 5, 2006, the contents of which are incorporated by reference herein in their entirety.

DISCLOSURE OF INVENTION

TECHNICAL SOLUTION

This disclosure relates to transmitting information in a mobile communications system.

FIG. 1 illustrates an exemplary network structure of an E-UMTS. The E-UMTS system is a system that has evolved from an existing UMTS system.

Basic standardization for the E-UMTS system is currently being developed by the Third Generation Partnership Project (3GPP). The E-UMTS system may be referred to as a Long Term Evolution (LTE) system.

As illustrated in FIG. 1, an E-UMTS network may consist of an E-UTRAN and a Core Network (CN). The E-UTRAN may include User Equipment (UE), a base station, referred to as eNode B or eNB, and an Access Gateway (AG) located at the end of the network and connected to an external network.

The AG may be divided into a portion for processing user traffic and a portion for processing control traffic. The AG portion for processing user traffic and the AG portion for processing control traffic may be connected to each other via a new interface for communication.

One or more cells may exist in an eNode B (eNB). The eNode Bs may be connected by an interface for the transmission of user traffic and/or control traffic.

The CN may also include the AG and a node adapted for user registration of a UE. An interface may also be provided in the E-UMTS in order to divide the E-UTRAN and the CN.

Radio interface protocol layers between a mobile terminal and network may be classified into a first layer (L1), a second layer (L2) and a third layer (L3) based upon the lower three layers of an Open System Interconnection (OSI) model which is well known in communications systems. A physical layer of the first layer provides an information transfer service using a physical channel. A Radio Resource Control (RRC) layer positioned in the third layer controls radio resources between the mobile terminal and the network.

The RRC layer allows an RRC message exchange between the mobile terminal and the network. The RRC layer may be positioned in each network node, such as the eNode B and the AG, or positioned in either the eNode B or the AG.

FIG. 2 illustrates an architecture of radio interface protocols between a terminal and a UMTS Terrestrial Radio Access Network (UTRAN) based upon a 3GPP radio access network specification. The radio interface protocols of FIG. 2 are horizontally formed of a physical layer, a data link layer and a network layer and vertically formed of a user plane for transmitting data information and a control plane for transmitting control signals.

The protocol layers of FIG. 2 may be divided into a first layer (L1), a second layer (L2) and a third layer (L3) based upon the lower three layers of an Open System Inter-connection (OSI) model which is well known in communications systems. Each radio protocol layer in the control plane illustrated in FIG. 2 and each radio protocol layer in the user plane illustrated in FIG. 3 will now be explained.

A physical layer, which is a first layer, provides an information transfer service to an upper layer using a physical channel. The physical layer is connected to a Medium Access Control (MAC) layer (located at a higher level) via a transport channel.

Data is transferred between the MAC layer and the physical layer via a transport channel. Data also is transferred between different physical layers, specifically, between a physical layer of a transmitting side and a physical layer of a receiving side.

A MAC layer of the second layer provides a service via a logical channel to a Radio Link Control (RLC) layer, which is its upper layer. The RLC layer of the second layer supports reliable data transmission.

The functions performed by the RLC layer may be implemented as a functional block within the MAC. However, the RLC layer may not exist.

A Packet Data Convergence Protocol (PDCP) layer of the second layer is used to effectively transmit data using an IP packet, such as IPv4 or IPv6, on a radio interface with a relatively small bandwidth. The PDCP layer reduces unnecessary control information using a function called a header compression for this purpose.

A Radio Resource Control (RRC) layer located at the lowest portion of the third layer is only defined in the control plane. The RRC layer handles the transport and physical channels for the configuration, re-configuration and release of radio bearers. A Radio Bearer (RB) denotes a service provided by the second layer for data transfer between the mobile terminal and the UTRAN.

Downlink transport channels for transmitting data from a network to a mobile terminal may include a Broadcast Channel (BCH) for transmitting system information and a downlink Shared Channel (SCH) for transmitting user traffic or a control message. A traffic or control message of a downlink multicast or broadcast service may be transmitted either via the downlink SCH or via a separate downlink Multicast Channel (MCH). Uplink transport channels for transmitting data from a mobile terminal to a network may include a Random Access Channel (RACH) for transmitting an initial control message and an uplink Shared Channel (SCH) for transmitting a user traffic or control message.

Hereinafter, a random access channel (RACH) will be explained in detail. In general, an RACH is used to obtain a radio resource if there is no uplink radio resource to transmit data when a terminal matches a time synchronization with a network or the terminal transmits the corresponding data over the uplink.

For example, a terminal generally matches a downlink synchronization to enable reception of system information from a cell it desires to access when the terminal is turned on. The terminal should transmit an access request message to the network or base station for an RRC connection after receiving the system information. However, the terminal uses the RACH if it does not currently match the time synchronization with the network and does not acquire an uplink radio resource.

In other words, the terminal requests a radio resource for transmitting an access request message from the network using the RACH. The base station then allocates an appropriate radio resource to the terminal in order to allow the terminal to transmit an RRC connection message. The terminal can then transmit the RRC connection message to the network using the allocated radio resource.

In another example, the terminal acquires a radio resource from the network according to radio resource scheduling and transmits data to the network using the allocated radio resource when the terminal forms an RRC connection with the network. However, the network may not allocate the uplink radio resource if there is no data left in the terminal buffer because it is inefficient to allocate an uplink radio resource to a terminal that has no data to transmit. The state of the terminal buffer is reported to the network periodically or according to an event generation. If new data that does not require a radio resource is generated in the buffer, the terminal uses the RACH because it does not currently have the uplink radio resource allocated. In other words, the terminal requests a radio resource required for data transmission from the network using the RACH.

Hereinafter, a RACH in a Wideband Code Division Multiple Access (WCDMA) will be explained. The RACH channel is used to transmit data with a short length over an uplink.

A portion of RRC messages, such as an RRC connection request message, a cell update message or a URA update message, may be transmitted on the RACH. A logical channel CCCH (Common Control Channel), DCCH (Dedicated Control Channel) and DTCH (Dedicated Traffic Channel) are mapped to the RACH and the RACH is mapped to a physical channel PRACH (Physical Random Access Channel).

The physical layer of a terminal selects one access slot and one signature to transmit a PRACH preamble via an uplink when the terminal MAC indicates a PRACH transmission to a physical layer of the terminal. The preamble is transmitted for an access slot interval having a length of 1.33 ms. One of 16 signatures is selected and transmitted for a certain length of an initial portion of the access slot.

The base station transmits a response signal using a downlink physical channel AICH (Acquisition Indicator Channel) after the terminal transmits the preamble. The AICH transmitted in response to the preamble transmits the signature selected by the preamble for a certain length of the initial portion of the access slot corresponding to the transmitted access slot.

The base station transmits a positive response (ACK) or negative response (NACK) to the terminal using the signature transmitted from the AICH. The terminal transmits a message portion with a length of 10 ms or 20 ms using an OVSF code corresponding to the transmitted signature upon receiving the ACK. The terminal MAC indicates the PRACH transmission again to the physical layer of the terminal after an appropriate time period upon receiving the NACK. The terminal transmits a new preamble using power one level higher than that of the previous preamble after a designated access slot if the terminal has not received the AICH corresponding to a previously transmitted preamble.

Channel Quality Indicator (CQI) information is information that enables a terminal to measure a downlink channel state in a current cell and provide the measured state to the base station. The base station then performs radio resource scheduling using the provided CQI information. For example, if the value of CQI may be between 1 to 10, whereby 1 indicates that a channel is not in a good state and 10 indicates that the channel is in a good state.

The base station may determine that the current downlink channel is in a good state and transmit data to the terminal according to a higher bit rate when the terminal transmits CQI information of 10 to the base station. Conversely, the base station may determine that the downlink channel is not in a good state and transmit data to the terminal according to a lower bit rate when the terminal transmits CQI information of 1 to the base station. The base station previously informs the terminal that the terminal should perform reporting periodically or according to an event generation in order to transmit the CQI information.

The present inventors recognized at least the following problems in currently existing RACH procedures. As previously indicated, the terminal first selects one signature and one access slot and then transmits a preamble over an uplink when using the RACH. Thereafter, the terminal transmits a message portion to the base station upon receiving an ACK from the base station in response to the preamble. Therefore, the terminal must perform the preamble transmission, the ACK reception and the message portion transmission in order to inform the base station of specific information using the RACH in related art methods. As a result, delay time is increased and radio resources are wasted. Based upon such problem recognition, various features and aspects described herein have been conceived by the present inventors.

An aspect of this disclosure is to provide a method of transmitting information in a mobile communications system that prevents unnecessary consumption of radio resources and reduces delay time for information transfer.

In one aspect, a method for allocating radio resources in a mobile communication system is provided. The method includes receiving grouping information related to signatures and occasions for accessing a Random Access Channel (RACH), selecting one signature and one Random Access Channel (RACH) occasion according to the grouping information, transmitting a preamble according to the selected signature and RACH occasion, receiving a message including a radio resource allocated according to the selected signature and RACH occasion and transmitting data using the allocated radio resource.

It is contemplated that RACH signatures and occasions are grouped according to predetermined criteria. It is further contemplated that the predetermined criteria include at least one of a purpose for using RACH, CQI information, a requested amount of radio resources and an establishment cause.

It is contemplated that the purpose for using RACH includes one of an initial access, handover, maintaining synchronization, an access release and a radio resource request. It is further contemplated that the establishment cause includes one of an emergency call, transition from an idle state to an active state and transition from a disconnected state to an active state. The grouping information may be received in one of system information and a paging message.

In another aspect of this disclosure, a method for allocating radio resources in a mobile communication system is provided. The method includes transmitting grouping information related to signatures and occasions for accessing a Random Access Channel (RACH), receiving a preamble transmitted according to a signature and RACH occasion selected according to the grouping information, transmitting a message including a radio resource allocated according to the selected signature and RACH occasion and receiving data transmitted using the allocated radio resource.

It is contemplated that the method further includes grouping the RACH signatures and occasions according to predetermined criteria. It is further contemplated that the predetermined criteria include at least one of a purpose for using RACH, CQI information, a requested amount of radio resources and an establishment cause.

It is contemplated that the purpose for using RACH includes one of an initial access, handover, maintaining synchronization, an access release and a radio resource request. It is further contemplated that the establishment cause includes one of an emergency call, transition from an idle state to an active state and transition from a disconnected state to an active state.

It is contemplated that the grouping information is transmitted in one of system information and a paging message. It is further contemplated that the grouping information is transmitted in one of system information and a paging message. The method may further include changing and retransmitting the grouping information.

In another aspect of this disclosure, a method for allocating radio resources in a mobile communication system is provided. The method includes a network transmitting grouping information related to signatures and occasions for accessing a Random Access Channel (RACH), a mobile communication terminal selecting one signature and one Random Access Channel (RACH) occasion according to the grouping information, the mobile communication terminal transmitting a preamble according to the selected signature and RACH occasion, the network transmitting a message including a radio resource allocated according to the selected signature and RACH occasion and the mobile communication terminal transmitting data using the allocated radio resource.

It is contemplated that RACH signatures and occasions are grouped according to predetermined criteria. It is further contemplated that the predetermined criteria include at least one of a purpose for using RACH, CQI information, a requested amount of radio resources and an establishment cause.

It is contemplated that the purpose for using RACH includes one of an initial access, handover, maintaining synchronization, an access release and a radio resource request. It is further contemplated that the establishment cause includes one of an emergency call, transition from an idle state to an active state and transition from a disconnected state to an active state.

It is contemplated that the network transmits the grouping information in one of system information and a paging message. It is further contemplated that the method further includes the network changing and retransmitting the grouping information.

The foregoing and other features and aspects of this disclosure will become more apparent from the following detailed description when taken in conjunction with the accompanying drawings.

Additional features and aspects will be set forth in the description that follows, and in part will be apparent from the description, or may be learned by practice of the features in this disclosure. It is to be understood that both the foregoing general description and the following detailed description are exemplary and explanatory and are intended to provide further explanation of the claims.

These and other exemplary embodiments will also become readily apparent to those skilled in the art from the following detailed description of the embodiments having reference to the attached figures, the features herein not being limited to any particular embodiments disclosed.

The accompanying drawings, which are included to provide further understanding and are incorporated in and constitute a part of this specification, illustrate various exemplary embodiments and together with the description serve to explain the principles of this disclosure. Features, elements, and aspects that are referenced by the same numerals in different figures represent the same, equivalent, or similar features, elements, or aspects in accordance with one or more embodiments.

FIG. 1 illustrates an exemplary network structure of an E-UMTS that is a mobile communications system.

FIG. 2 illustrates each layer on a control plane of radio protocols.

FIG. 3 illustrates each layer on a user plane of radio protocols.

FIG. 4 illustrates a grouping of all RACH occasions by a base station according to a particular purpose according to certain embodiment(s).

FIG. 5 illustrates how a base station combines signatures and RACH occasions for their grouping according to certain embodiment(s).

FIG. 6 illustrates a grouping according to the combination of an establishment cause and CQI information described in FIG. 5.

FIG. 7 illustrates signal flow of a method for transmitting information in a mobile communications system in accordance with certain embodiment(s).

Description will now be given in detail with reference to the accompanying drawings. The features herein may be implemented in a mobile communications system, such as a UMTS. However, such features may be applied to other communications systems that are operated according to other specifications.

This disclosure proposes a method by which a terminal informs a base station of certain information using a preamble signature and transmission timing, or transmission occasion, of a RACH in order to decrease delay time before transmitting data and make efficient use of uplink radio resources. In order to accomplish this, the features described herein classify signatures and transmission occasions according to specific information for use.

In one embodiment, the features are implemented such that a preamble can be transmitted by selecting one signature and one resource from signatures grouped according to first information and transmission occasions grouped according to second information in a signature group and a RACH resource group classified according to several specific information. The specific information may include usage purpose of RACH, CQI information, information related to a requested amount of radio resource and information on an establishment cause.

For example, the usage purpose of RACH may include an initial access of a terminal, handover, synchronization maintenance, an access release, and a radio resource request. The CQI information is a value indicating a downlink channel state. The requested amount of radio resource indicates a buffer state of the terminal, which may be indicated with 50 bits, 100 bits, or 200 bits. The establishment cause may denote an emergency call, change of the terminal from an idle state to an active state, or change of the terminal from a disconnected, or detached state, to an active state.

The RACH resource may indicate a RACH occasion. Specifically, the RACH resource indicates informing terminals within a cell of resource information related to use of the RACH by the base station.

The resource information is configured with a specific frequency and a specific time. The resource information may also include a duration of the RACH occasion.

In another embodiment, the features are implemented such that a preamble can be transmitted by selecting one signature from the combination of signatures and RACH occasions and a group configured with the combination as well as by using signatures grouped according to first information and transmission occasions grouped according to second information. In one exemplary embodiment, one signature always has the same meaning, such as information. However, one signature may have another meaning according to a transmission occasion with which it is combined in this embodiment.

Explanation will now be given of a method for selecting one signature and one resource from signatures grouped according to first information and transmission occasions grouped according to second information in order to transmit a preamble.

Signature Selection

A base station groups all the signatures according to a specific purpose. Information related to the grouped signatures is transmitted to a terminal using system information or a paging message. Therefore, the terminal selects one signature group from signature groups classified according to specific information related to a state of the terminal when using RACH. The terminal randomly selects one signature from the corresponding signature group once the one signature group has been selected.

For example, if there are 64 signatures, numerals 0 to 63 are set to the signatures. The base station uses a usage purpose of RACH as specific information that is a criterion for the grouping. A group 1 may be configured for the purpose of an initial access, a group 2 may be configured for the purpose of handover, a group 3 may be configured for the purpose of a synchronization maintenance, a group 4 may be configured for the purpose of an access release, and a group 5 may be configured for the purpose of a radio resource request. The base station appropriately maps the whole signatures onto each group.

In other words, the group 1 has signatures from 0 to 11, group 2 has signatures from 12 to 23, group 3 has signatures from 24 to 35, group 4 has signatures from 36 to 47, and group 5 has signatures from 48 to 63. Information (or grouping information) regarding the signatures grouped according to the usage purpose of RACH is transmitted to the terminal using system information or a paging message. Therefore, the terminal selects group 2 according to the set grouping information and thereafter randomly selects one of the signatures having numerals from 12 to 23 mapped onto the group 2 if the purpose of RACH is for handover.

Furthermore, the base station can dynamically change the grouping information. In other words, the base station can map more signatures onto the corresponding group if terminals within a cell frequently use a certain group among the signature groups.

For example, if group 4 has 12 signatures and group 5 has 16 signatures, the base station may decrease the number of signatures in group 4 and increase the number of signatures in group 5 if a frequency of use of the terminal within the cell is low in the group 4 and high in the group 5. The changed information related to the signature grouping is transmitted from the base station to the terminal using system information or a paging message.

RACH Occasion Selection

As illustrated in FIG. 4, the base station groups entire RACH occasions according to a specific purpose. The specific purpose may be the same as the previously disclosed specific information used as the criterion for the grouping of signatures or may be different.

For example, signatures may be grouped according to the usage purpose of RACH and RACH occasions may be grouped according to CQI information or both signatures and RACH occasions may be grouped according to the usage purpose of RACH. Grouping information related to the grouped RACH occasions is transmitted to the terminal using system information or a paging message.

Accordingly, one group is selected from the groups of the RACH occasions according to the state of the terminal when the terminal uses a RACH. If the selected group includes two or more RACH occasions, the terminal randomly selects one RACH occasion from the selected group.

The base station uses CQI information as specific information for grouping RACH occasions. For example, the base station groups a group A with a bad channel state, a group B with a good channel state, and a group C with a best channel state. The base station appropriately maps the RACH occasions onto each group.

Information related to the grouping according to the CQI information is transmitted to the terminal using system information or a paging message. The terminal selects group A according to the set grouping information if the terminal is in a bad channel state. The terminal randomly selects one RACH occasion if group A includes two or more RACH occasions.

The base station can also dynamically change the grouping information. The grouping information that is changed by the base station every period of the RACH occasion or every multiple of the period is transmitted to the terminal using system information or a paging message.

A method of selecting one of groups configured by the combination of signatures and RACH occasions in order to transmit a preamble will now be explained. In this method, a particular signature may not always have the same information. For example, the same signature can deliver different information depending on an RACH occasion with which it is combined.

FIG. 5 illustrates how a base station combines signatures and RACH occasions for their grouping. FIG. 6 illustrates an actual grouping according to the combination of an establishment cause and CQI information described in FIG. 5.

As illustrated in FIG. 5, within one period, four RACH occasions A, B, C and D exist. The four RACH occasions may exist at the same time as shown in FIG. 5 or exist separately at different times. For example, the four RACH occasions A, B, C and D may all exist at Time 2 or exist separately at times 4, 5 and 6. The total number of signatures is assumed to be 16.

Establishment cause and CQI information are used as criteria for a grouping. The establishment cause and CQI information are used, respectively, in two cases. Four groups are generated using the establishment cause and CQI information as illustrated in FIG. 6. The terminal randomly selects one value from a third group which includes C5~C9 and D0~D8 if the establishment cause of the terminal is A and CQI value is 1. C5 indicates a RACH occasion of C and a signature of 5.

As previously indicated, one signature and one RACH occasion may not always indicate the same information. For example, a signature 10 may deliver different information depending on the RACH occasion with which it is combined. A RACH occasion A may also deliver different information depending on the signature with which it is combined. The grouping information according to the combination of signatures and RACH occasions are also transmitted to the terminal using system information or a paging message.

FIG. 7 illustrates an exemplary signal flow of a method of transmitting information in a mobile communications system in accordance with a certain embodiment(s). As illustrated in FIG. 7, a base station 20 groups entire signatures and RACH occasions according to specific purposes and informs a terminal 10 of information related to the grouping using system information or a paging message (S10).

According to a setup of the base station 20, the terminal 10 selects one signature and one RACH occasion from the groups of signatures and RACH occasions or selects one group from groups configured by the combination of signatures and RACH occasions (S11). Using the previous example, the terminal 10 selects one value from the third group including C5-C9 and D0-D8.

The terminal 10 then transmits a preamble to the base station 20 using the selected signature and RACH occasion (S12). The base station 20 then determines to which group the corresponding signature and RACH occasion belong and schedules a radio resource according to the determination in order to allocate an appropriate radio resource to the terminal 10 (S13).

For example, when the terminal 10 has used a signature group for an initial access and RACH occasions have been grouped according to a requested amount of radio resources of 100 bits, the base station 20 allocates an appropriate radio resource to the terminal based upon the information. The terminal uses the corresponding radio resource to transmit uplink data to the base station 20 after receiving the appropriate radio resource allocated from the base station (S14).

The features described herein may be implemented such that a preamble transmission is used to inform the base station of specific information when the terminal uses a RACH and the base station can efficiently allocate a radio resource for data transmission to the terminal according to the specific information. Delay time before the terminal transmits data is reduced and consumption of radio resources is prevented or at least minimized.

As the features in this disclosure may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are intended to be embraced by the appended claims.

The foregoing embodiments and features are merely exemplary and are not to be construed as limiting. The present teachings can be readily applied to other types of apparatuses.

This description is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for allocating radio resources in a mobile communication system, the method comprising:
   receiving, by a mobile terminal, a system information block (SIB) including grouping information for a random access procedure;
   if two or more preamble groups exist, selecting, by the mobile terminal, at least one preamble group using the SIB based on an amount of data to be transmitted by the mobile terminal;
   randomly selecting, by the mobile terminal, at least one preamble within the selected preamble group; and
   transmitting, by the mobile terminal, the selected preamble.

2. The method of claim 1, wherein the amount of data is related with a potential message size that is to be transmitted by the mobile terminal.

3. The method of claim 2, wherein the potential message size is related with data available for transmission plus a medium access control (MAC) header and/or MAC control elements.

4. The method of claim 1, wherein the SIB is a random access channel (RACH) configuration common information element.

5. The method of claim 1, wherein the at least one selected preamble is used for accessing a Random Access Channel (RACH).

6. The method of claim 1, wherein the at least one preamble is selected within the selected preamble group with equal probability.

7. A mobile communication apparatus, comprising:
   a receiving unit adapted to receive a system information block (SIB) including grouping information for a random access procedure; and
   a control unit adapted to select at least one preamble group using the SIB based on an amount of data to be transmitted by a mobile terminal if two or more preamble groups exist, to randomly select at least one preamble within the selected preamble group, and to transmit the selected preamble.

8. The apparatus of claim 7, wherein the amount of data is related with a potential message size that is to be transmitted by the mobile terminal.

9. The apparatus of claim 8, wherein the potential message size is related with data available for transmission plus a medium access control (MAC) header and/or MAC control elements.

10. The apparatus of claim 7, wherein the SIB is a random access channel (RACH) configuration common information element.

11. The apparatus of claim 7, wherein the at least one selected preamble is used for accessing a Random Access Channel (RACH).

12. The apparatus of claim 7, wherein the at least one preamble is selected within the selected preamble group with equal probability.

* * * * *